(12) United States Patent
Park et al.

(10) Patent No.: US 7,038,757 B2
(45) Date of Patent: May 2, 2006

(54) METHOD FOR FABRICATING A LIQUID CRYSTAL DISPLAY DEVICE HAVING CHOLESTERIC LIQUID CRYSTAL COLOR FILTER LAYER WITH HIGH APERTURE RATION

(75) Inventors: Su-Hyun Park, Anyang-si (KR); Jong-Weon Moon, Anyang-si (KR)

(73) Assignee: LG.Philips LCD Co. Ltd., Seoul (KR)

( * ) Notice: Subject to any disclaimer, the term of this patent is extended or adjusted under 35 U.S.C. 154(b) by 0 days.

(21) Appl. No.: 11/229,623

(22) Filed: Sep. 20, 2005

(65) Prior Publication Data

US 2006/0012746 A1 Jan. 19, 2006

Related U.S. Application Data

(62) Division of application No. 10/667,360, filed on Sep. 23, 2003.

(30) Foreign Application Priority Data

Dec. 20, 2002 (KR) ................................ 2002-81963

(51) Int. Cl.
*G02F 1/13* (2006.01)
*G02F 1/1335* (2006.01)
*C09K 19/02* (2006.01)

(52) U.S. Cl. ................ 349/187; 349/106; 349/185
(58) Field of Classification Search ................ 349/106, 349/185, 187, 175
See application file for complete search history.

(56) References Cited

U.S. PATENT DOCUMENTS

| 6,127,072 | A  | * | 10/2000 | Shiba et al. ............... 430/7 |
| 6,248,482 | B1 | * | 6/2001  | Kashiwazaki et al. ......... 430/7 |
| 6,606,137 | B1 |   | 8/2003  | Lee |
| 6,788,369 | B1 |   | 9/2004  | Ichihashi |
| 6,794,216 | B1 |   | 9/2004  | Ko |
| 6,833,889 | B1 |   | 12/2004 | Moon et al. |

* cited by examiner

*Primary Examiner*—Tarifur R. Chowdhury
(74) *Attorney, Agent, or Firm*—McKenna Long & Aldridge LLP

(57) ABSTRACT

A fabricating method of a substrate for a liquid crystal display device includes: coating a cholesteric liquid crystal material on a substrate to form a cholesteric liquid crystal layer, the substrate having a plurality of sub-pixel regions; disposing a mask having a plurality of open portions over the cholesteric liquid crystal layer; irradiating the cholesteric liquid crystal layer through the mask and curing the cholesteric liquid crystal layer, wherein each open portion is smaller than each sub-pixel region.

7 Claims, 10 Drawing Sheets third irradiation energy < second irradiation energy < first irradiation energy

METHOD FOR FABRICATING A LIQUID CRYSTAL DISPLAY DEVICE HAVING CHOLESTERIC LIQUID CRYSTAL COLOR FILTER LAYER WITH HIGH APERTURE RATION

This application is a Divisional of prior application Ser. No. 10/667,360, filed Sep. 23, 2003.

This application claims the benefit of Korean Patent Application No. 2002-81963, filed on Dec. 20, 2002, which is hereby incorporated by reference for all purposes as if fully set forth herein.

BACKGROUND OF THE INVENTION

1. Field of the Invention

The present invention relates to liquid crystal display devices, and more particularly to liquid crystal display devices using a cholesteric liquid crystal color filter layer.

2. Discussion of the Related Art

Liquid crystal display (LCD) devices are developed as next generation display devices because of their characteristics of light weight, thin profile, and low power consumption.

Among the various types of LCD devices commonly used, active matrix LCD (AM-LCD) devices, in which thin film transistors (TFTs) and pixel electrodes connected to the TFTs are disposed in matrix, have been developed because of their high resolution and superior display of moving images.

FIG. 1 is a schematic plan view of a liquid crystal display device according to the related art.

In FIG. 1, a plurality of gate lines 14 are formed along a first direction and a plurality of data lines 24 are formed along a second direction perpendicular to the first direction. The gate line 14 crosses the data line 24 to define a sub-pixel region "Psub." A thin film transistor (TFT) "T" is formed near a cross of the gate line 14 and the data line 24. A pixel electrode 30 is connected to the TFT "T." A black matrix 52 (hatched area) is formed at borderline between the sub-pixel regions "Psub." The black matrix 52 has an open portion 51 exposing the pixel electrode 30. Even though not shown in FIG. 1, a color filter layer including red, green and blue sub-color filters is formed in the open portion 51. Each of the sub-color filters corresponds to the sub-pixel region "Psub." The color filter layer displaying colors by filtering light is generally formed of a photosensitive resin through a pigment dispersion method.

FIG. 2 is a schematic cross-sectional view, which is taken along a line "II—II" of FIG. 1, illustrating a liquid crystal display device according to the related art.

In FIG. 2, first and second substrates 10 and 50 face and are spaced apart from each other. A plurality of sub-pixel regions "Psub" are defined in the first and second substrates 10 and 50. A gate insulating layer 16 is formed on an inner surface of the first substrate 10, and a data line 24 is formed on the gate insulating layer 16 at a border between the sub-pixel regions "Psub." A passivation layer 28 is formed on the data line 24, and a pixel electrode 30 is formed on the passivation layer 28 in the sub-pixel region "Psub."

A black matrix 52 is formed on an inner surface of the second substrate 50 to correspond to the data line 24. A color filter layer 54 including red, green and blue sub-color filters 54a, 54b and 54c is on the black matrix 52 and the inner surface of the second substrate 50. Each of the red, green and blue sub-color filters 54a, 54b and 54c corresponds to the sub-pixel region "Psub." A common electrode 58 is formed on the color filter layer 54. A liquid crystal layer 70 is formed between the pixel electrode 30 and the common electrode 58.

Even though not shown in FIG. 2, the red, green and blue sub-color filters 54a, 54b and 54c are sequentially formed through a pigment dispersion method including: a step of coating a photosensitive resin on the black matrix 52; a step of aligning a mask having an open portion corresponding to the sub-pixel region "Psub"; a step of exposing the coated photosensitive resin through the mask; a step of developing the exposed photosensitive resin; and a step of curing the developed photosensitive resin. The absorption-type color filter layer 54 filters light to transmit only light having a wavelength band corresponding to a specific color. Accordingly, as the color filter layer 54 is used over a long time period, color characteristics and transmittance are reduced.

To solve these problems, a color filter layer using cholesteric liquid crystal (CLC) which selectively reflects and transmits light has been developed. Because the CLC itself selectively reflects and transmits light, high color purity can be obtained. Moreover, an additional reflecting layer can be omitted when the CLC used for a reflective type LCD device. In the CLC, liquid crystal molecules are aligned to have a helical structure. The helical structure has a direction of circulation and a helical pitch. The helical pitch is a distance from a liquid crystal molecule layer having a specific alignment state to a next liquid crystal molecule layer having the same alignment state, and a color reflected by the CLC is determined by the helical pitch. A central wavelength of reflected light is a function of the helical pitch "p" and the average refractive index "$n_{avg}$" of the CLC. ($\lambda = n_{avg} \cdot p$). For example, when a CLC has an average refractive index of about 1.5 and a helical pitch of about 430 nm, a central wavelength of reflected light is about 650 nm and the CLC reflects red colored light. Similarly, the CLC can be formed to have corresponding helical pitch, thereby reflecting green or blue colored light.

FIG. 3 is a schematic cross-sectional view, taken along a line "II—II" of FIG. 1, illustrating a liquid crystal display device using a cholesteric liquid crystal color filter layer according to the related art.

In FIG. 3, first and second substrates 110 and 150 having a plurality of sub-pixel regions "Psub" face each other and are spaced apart from each other. A light absorption layer 112 is formed on an inner surface of the first substrate 110, and a cholesteric liquid crystal color filter (CCF) layer 114 is formed on the light absorption layer 112. The CCF layer 114 includes red, green and blue CCFs 114a, 114b and 114c in each sub-pixel region "Psub." A common electrode 116 is formed on the CCF layer 114. A gate insulating layer 152 is formed on an inner surface of the second substrate 150 and a data line 154 is formed on the gate insulating layer 152 corresponding to a border between the sub-pixel regions "Psub." A black matrix 156 is formed on the data line 154 and a passivation layer 158 is formed on the black matrix 156. A pixel electrode 160 is formed on the passivation layer 158 in each sub-pixel region "Psub." A liquid crystal layer 170 is formed between the common electrode 116 and the pixel electrode 160.

A retardation layer 162 and a polarizing layer 164 are sequentially formed on an outer surface of the second substrate 150 to prevent phase delay of light and improve optical efficiency. For example, the retardation layer 162 can be a quarter wave plate (QWP), which delays phase by $\lambda/4$, and the polarizing layer 164 can be a linear polarizer, which transmits only light having a polarization axis parallel to the transmission axis of the polarizing layer 164.

When incident light enters a reflective LCD device using the CCF layer 114, only light corresponding to a specific wavelength band selectively reflects from the CCF layer 114. Other light passes through the CCF layer 114 and then is absorbed into the light absorption layer 112. When the reflected light again passes through the second substrate 150, the black matrix 156 shields light passing through the liquid crystal layer 170 in a portion not driven by the pixel electrode 160. Contrary to an LCD device using an absorption type color filter layer, a reflective LCD device using a CCF layer uses selective reflection property of the CCF layer. Accordingly, the CCF layer is formed on the first substrate, and the black matrix is formed on the second substrate to shield leakage light and prevents light entrance into a thin film transistor (TFT). As a result, the CCF layer and the black matrix are formed on different substrates, respectively.

In general, photochromic CLC, whose helical pitch is determined according to irradiation energy of ultra violet (UV) light, is used for the CCF layer 114. The CCF layer 114 is formed through a coloring method where UV light having different energies is irradiated onto a photochromic CLC layer in each of red, green and blue sub-pixel region "Psub" and then the irradiated CLC layer is cured. When the CCF layer 114 is formed through the coloring method, the helical pitch continuously varies in border portions between red, green and blue sub-pixel regions "Psub." Thus, each sub-pixel region "Psub" does not display its own color distinctively. Instead, there exist color-blurring regions "A" in the border portions between sub-pixel regions "Psub." For example, the CCF layer 114 in the color-blurring region "A" between the red and green sub-pixel regions "Psub" reflects yellow colored light. Similarly, the CCF layer 114 in the color-blurring region between the green and blue sub-pixel regions "Psub" reflects cyan colored light, and the CCF layer 114 in the color-blurring region between the blue and red sub-pixel regions "Psub" reflects magenta colored light.

FIG. 4A is a schematic cross-sectional view of a substrate having an absorption type color filter layer according to the related art.

In FIG. 4A, a black matrix 132 is formed on a substrate 130 and a color filter layer 134 is formed on the black matrix 132. The color filter layer 134 includes red, green and blue color filters 134a, 134b and 134c in each sub-pixel region "Psub." Even though not shown in FIG. 4A, the red, green and blue color filters 134a, 134b and 134c are formed through coating, exposing, developing and curing processes of respective photosensitive resin. Accordingly, a color blurring between adjacent color filters can be prevented. In addition, even when a color blurring occurs, the black matrix 132 can shield the color blurring due to resolution of an exposure apparatus for the color filter layer. For example, when a width of each sub-pixel region "Psub," i.e., each of the red, green and blue color filters 134a, 134b and 134c, is about 93 µm, a width of the black matrix 132 is about 24 µm.

FIG. 4B is a schematic cross-sectional view of a substrate having a cholesteric liquid crystal color filter layer fabricated through a coloring method excluding a blue coloring process according to the related art.

In FIG. 4B, a light absorption layer 142 is formed on a substrate 140 and a cholesteric liquid crystal color filter (CCF) layer 144 is formed on the light absorption layer 142. The CCF layer 144 includes red, green and blue CCFs 144a, 144b and 144c in each sub-pixel region "Psub." The red and green CCFs 144a and 144b are formed through coating and coloring processes of blue colored cholesteric liquid crystal (CLC), while the blue CCF 144c is formed through coating process of blue colored CLC. When a coloring process for a sub-pixel region "Psub" is performed, a color blurring is generated at a peripheral portion of each CCF 144a and 144b. Since a blue coloring process is not performed, a color blurring does not occur at a peripheral portion of the blue CCF 144c. Accordingly, a first color blurring region "A1" between the blue and red CCFs 144c and 144a or between the blue and green CCFs 144c and 144b has a smaller area than a second color blurring region "A2" between the red and green CCFs 144a and 144b.

FIG. 4C is a schematic cross-sectional view of a substrate having a cholesteric liquid color filter layer fabricated through a coloring method including a blue coloring process according to the related art.

In FIG. 4C, a light absorption layer 182 is formed on a substrate 180 and a cholesteric liquid crystal color filter (CCF) layer 184 is formed on the light absorption layer 182. The CCF layer 184 includes red, green and blue CCFs 184a, 184b and 184c in each sub-pixel region "Psub." The red, green and blue CCFs 184a, 184b and 184c are formed through coating and coloring processes of blue colored cholesteric liquid crystal (CLC). When a coloring process for a sub-pixel region "Psub" is performed, a color blurring is generated at a peripheral portion of each CCF 184a, 184b and 184c. Since a coloring process is performed for all of red, green and blue colors, a color blurring occurs at a peripheral portion of each of the red, green and blue CCFs 184a, 184b and 184c. Accordingly, a color blurring region "A" has equal area throughout the entire substrate 180. Thus, a total area of the color blurring regions "A" of FIG. 4C is larger than that of FIG. 4B.

For example, a width of the second color blurring region "A2" of FIG. 4B and the color blurring region "A" of FIG. 4C is about 24 µm. In the color blurring region "A1," "A2" and "A," a helical pitch continuously varies with a value different from that in the sub-pixel region "Psub." Accordingly, a color blurring region degrades color property of an LCD device using a CCF layer. Moreover, a black matrix for shielding a color blurring region reduces aperture ratio.

SUMMARY OF THE INVENTION

Accordingly, the present invention is directed to a transmissive liquid crystal display device that substantially obviates one or more of the problems due to limitations and disadvantages of the related art.

An advantage of the present invention is to provide a liquid crystal display device using a cholesteric liquid crystal color filter layer where color property is improved by minimizing a color blurring region.

An advantage of the present invention is to provide a fabricating method of a liquid crystal display device using a mask, which has an open portion smaller than a sub-pixel region, for a cholesteric liquid crystal color filter layer.

An advantage of the present invention is to provide transmissive and reflective liquid crystal display devices using a cholesteric liquid crystal color filter layer where a color blurring region is minimized.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a fabricating method of a substrate for a liquid crystal display device includes: coating a cholesteric liquid crystal material on a substrate to form a cholesteric liquid crystal layer, the substrate having a plurality of sub-pixel regions; disposing a mask having a plurality of open portions over the cholesteric liquid crystal layer; irradiating the cholesteric liquid crystal layer through the mask and curing the cholesteric liquid crystal layer, wherein each open portion is smaller than each sub-pixel region.

In another aspect of the present invention, a fabricating method of a substrate for a liquid crystal display device includes: coating a first cholesteric liquid crystal material on a substrate to form a first cholesteric liquid crystal layer, the substrate having a plurality of sub-pixel regions; disposing a first mask having a plurality of first open portions over the first cholesteric liquid crystal layer; irradiating the first cholesteric liquid crystal layer through the first mask and curing the first cholesteric liquid crystal layer to form a first cholesteric liquid crystal color filter layer; coating a second cholesteric liquid crystal material on the first cholesteric liquid crystal color filter layer to form a second cholesteric liquid crystal layer; disposing a second mask having a plurality of second open portions over the second cholesteric liquid crystal layer; irradiating the second cholesteric liquid crystal layer through the second mask and curing the second cholesteric liquid crystal layer to form a second cholesteric liquid crystal color filter layer, wherein each of the first and second open portions is smaller than each sub-pixel region.

In another aspect, a fabricating method of a liquid crystal display device includes: forming a light absorption layer on a first substrate having a plurality of sub-pixel regions; coating a cholesteric liquid crystal material on the light absorption layer to form a cholesteric liquid crystal layer; disposing a mask having a plurality of open portions over the cholesteric liquid crystal layer; irradiating the cholesteric liquid crystal layer through the mask and curing the cholesteric liquid crystal layer to form a cholesteric liquid crystal color filter layer; forming a common electrode on the cholesteric liquid crystal color filter layer; forming a gate line on a second substrate; forming a data line crossing the gate line; forming a switching device connected to the gate line and data line; forming a black matrix on the data line; forming a passivation layer on the black matrix; forming a pixel electrode on the passivation layer; attaching the first and second substrates such that the common electrode faces the pixel electrode; and forming a liquid crystal layer between the common electrode and the pixel electrode, wherein each open portion is smaller than each sub-pixel region.

In another aspect, a fabricating method of a liquid crystal display device includes: coating a first cholesteric liquid crystal material on a substrate to form a first cholesteric liquid crystal layer, the substrate having a plurality of sub-pixel regions; disposing a first mask having a plurality of first open portions over the first cholesteric liquid crystal layer; irradiating the first cholesteric liquid crystal layer through the first mask and curing the first cholesteric liquid crystal layer to form a first cholesteric liquid crystal color filter layer; coating a second cholesteric liquid crystal material on the first cholesteric liquid crystal color filter layer to form a second cholesteric liquid crystal layer; disposing a second mask having a plurality of second open portions over the second cholesteric liquid crystal layer; irradiating the second cholesteric liquid crystal layer through the second mask and curing the second cholesteric liquid crystal layer to form a second cholesteric liquid crystal color filter layer; forming a common electrode on the second cholesteric liquid crystal color filter layer; forming a gate line on a second substrate; forming a data line crossing the gate line; forming a switching device connected to the gate line and data line; forming a black matrix on the data line; forming a passivation layer on the black matrix; forming a pixel electrode on the passivation layer; attaching the first and second substrates such that the common electrode faces the pixel electrode; and forming a liquid crystal layer between the common electrode and the pixel electrode, wherein each of the first and second open portions is smaller than each sub-pixel region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, similar reference numbers will be used throughout the drawings to refer to the same or like parts.

Figure 5:
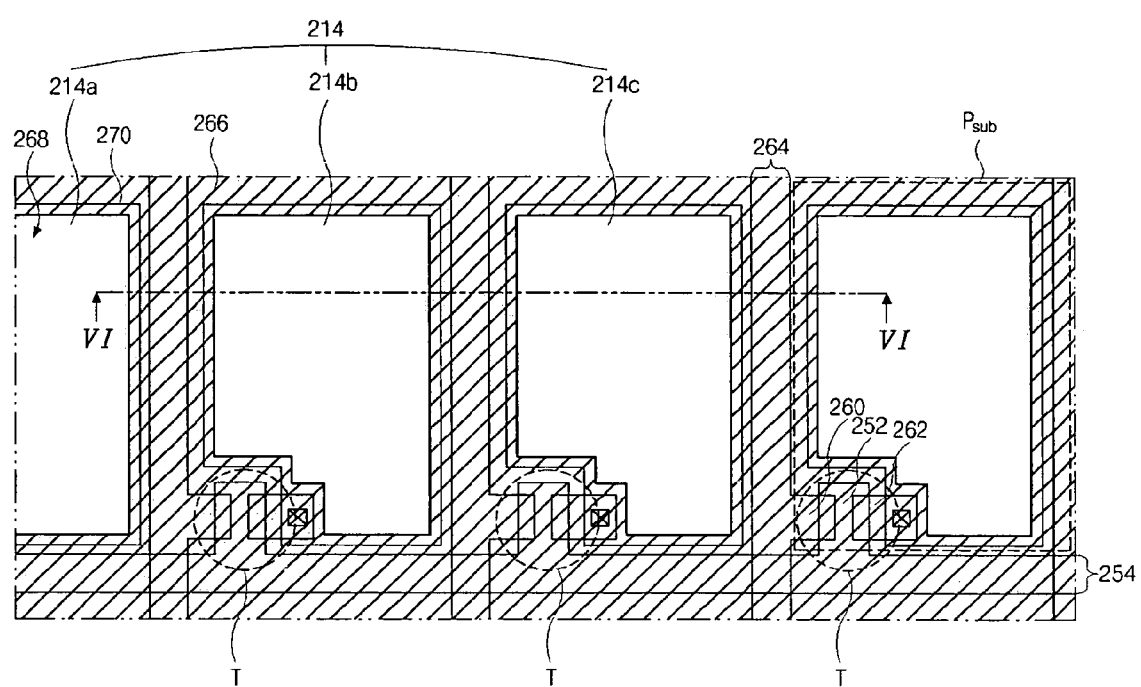
FIG. 5 is a schematic plane view illustrating a reflective liquid crystal display device according to a first embodiment of the present invention.

FIG. 5 is a schematic plane view illustrating a reflective liquid crystal display device according to a first embodiment of the present invention.

In FIG. 5, a gate line 254 is formed along a first direction, and a data line 264 is formed along a second direction crossing the first direction. A sub-pixel region "$P_{sub}$" is defined by a cross of the gate line 254 and the data line 264. A switching device such as a thin film transistor (TFT) "T" is formed near the cross of the gate line 254 and the data line 264, and a pixel electrode 270 connected to the TFT "T" is formed in each sub-pixel region "$P_{sub}$". The TFT "T" includes a gate electrode 252, and source and drain electrodes 260 and 262. The gate electrode 252 is connected to the gate line 254 and the source electrode 260 is connected to the data line 264. The source and drain electrodes 260 and 262 are spaced apart from each other. Even though not shown in FIG. 5, a semiconductor layer is formed between the gate electrode 252, and the source and drain electrodes 260 and 262. A portion of the semiconductor layer exposed between the source and drain electrodes 260 and 262 is a channel region of the TFT "T." A black matrix 266 having an open portion 268 covers a border between the adjacent sub-pixel regions "$P_{sub}$" and the TFT "T." Thus, the sub-pixel region "$P_{sub}$" is exposed through the open portion 268. Red, green and blue cholesteric liquid crystal color filters (CCFs) 214a, 214b and 214c corresponding to the open portion 268 are alternately formed in the sub-pixel regions "$P_{sub}$."

Figure 6:
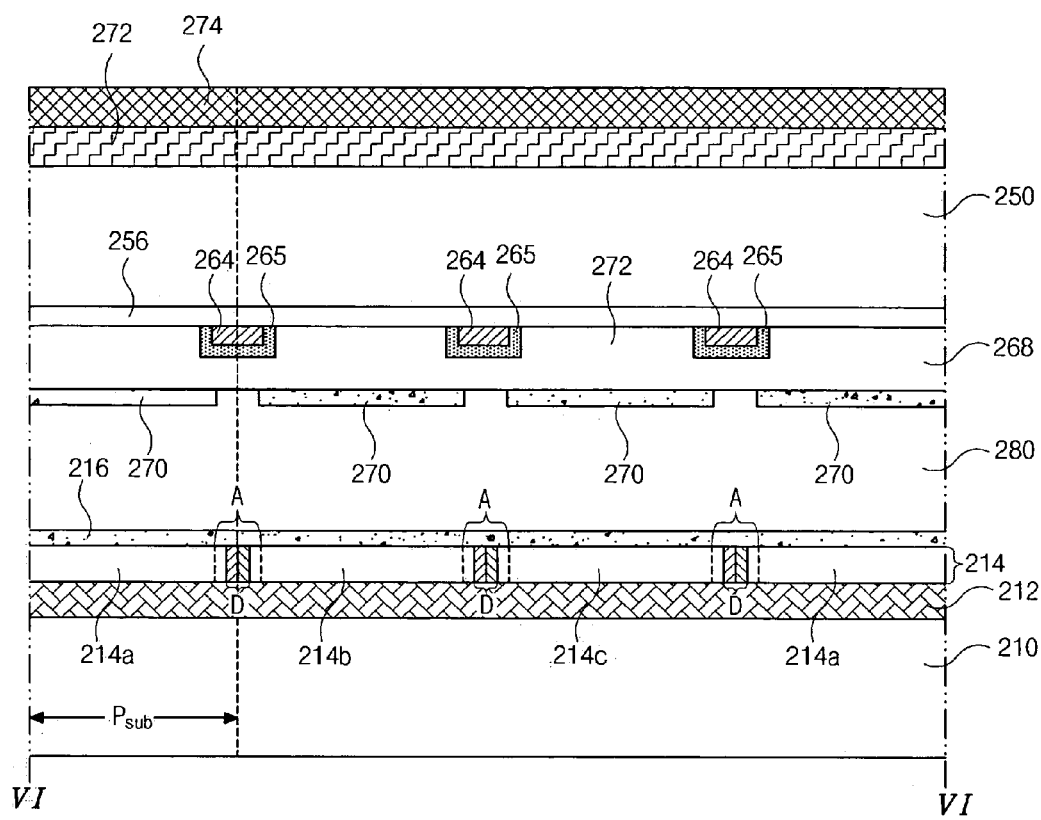
FIG. 6 is a schematic cross-sectional view, which is taken along a line "VI—VI" of FIG. 5, showing a reflective liquid crystal display device according to a first embodiment of the present invention.

FIG. 6 is a schematic cross-sectional view, which is taken along a line "VI—VI" of FIG. 5, illustrating a reflective liquid crystal display device according to a first embodiment of the present invention.

In FIG. 6, first and second substrates 210 and 250 face and are spaced apart from each other. The first and second substrates 210 and 250 include a plurality of sub-pixel regions "$P_{sub}$." A light absorption layer 212 is formed on an inner surface of the first substrate 210 and a cholesteric liquid crystal color filter (CCF) layer 214 is formed on the light absorption layer 212. The CCF layer 214 includes red, green and blue CCFs 214a, 214b and 214c in each sub-pixel region "$P_{sub}$." A common electrode 216 is formed on the CCF layer 214.

A gate line (not shown) is formed on an inner surface of the second substrate 250 and a gate insulating layer 256 is formed on the gate line. A data line 264 is formed on the gate insulating layer 256 at a border between the adjacent sub-pixel regions "$P_{sub}$." A black matrix 265 is formed on the data line 264, and a passivation layer 268 is formed on the black matrix 265. A pixel electrode 270 is formed on the passivation layer 268 in each sub-pixel region "$P_{sub}$." Even though not shown in FIG. 6, a switching element such as a thin film transistor (TFT) including a gate electrode, and source and drain electrodes is formed between the second substrate 250 and the passivation layer 268. Moreover, the passivation layer 268 includes a drain contact hole exposing the drain electrode, and the pixel electrode 270 is connected to the drain electrode of the TFT through the drain contact hole. A retardation layer 272 and a polarizing layer 274 may be formed on an outer surface of the second substrate 250.

The common electrode 216 and the pixel electrode 270 may be formed of a transparent conductive material such as indium-tin-oxide (ITO) or indium-zinc-oxide (IZO). A liquid crystal layer 280 is formed between the common electrode 216 and the pixel electrode 270. Even though not shown in FIG. 6, first and second alignment layers may be formed on the common electrode 216 and the pixel electrode 270, respectively. The CCF layer 214 may be formed of photochromic cholesteric liquid crystal (CLC). A color blurring region "D" at a border between the adjacent CCFs 214a, 214b and 214c is smaller than the color blurring region "A" of the related art in FIG. 3. The color blurring region can be reduced by using an improved mask for the CCF layer 214.

Figure 7:
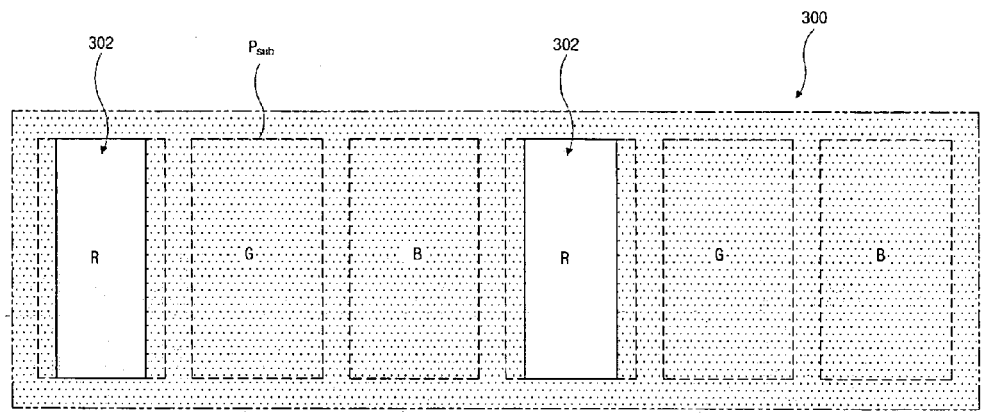
FIG. 7 is a schematic plan view showing a mask for a cholesteric liquid crystal color filter layer of a reflective liquid crystal display device according to a first embodiment of the present invention.

FIG. 7 is a schematic plan view illustrating a mask for a cholesteric liquid crystal color filter layer of a reflective liquid crystal display device according to a first embodiment of the present invention.

As discussed previously, a pixel region includes the plurality of sub-pixel regions "$P_{sub}$". Within a single pixel region there may be three sub-pixel regions: a red sub-pixel region "R", a green sub-pixel region "G", and a blue sub-pixel region "B". A mask for producing a cholesteric liquid crystal color filter according to the present invention is illustrated in FIG. 7 overlying a plurality of red, green and blue sub-pixel regions. As illustrated in FIG. 7, the mask 300 for a cholesteric liquid crystal color filter (CCF) layer includes a plurality of open portions 302. The open portions 302 corresponds to a sub-pixel region "$P_{sub}$" having cholesteric liquid crystal to be aligned to correspond to the color to be reflected by the CCF. As illustrated, the open portions 302 may be substantially rectangular, but may be of any shape suitable for the corresponding sub-pixel region "$P_{sub}$". The open portions 302 may correspond to the sub-pixel regions to be aligned to reflect a first color, for example, one of red, green or blue. The remaining sub-pixels are covered by blocking portions of the mask 302. Thus, the number of the open portions 302 may be the same as the number of sub-pixel regions to be aligned for the first color during a simultaneous exposing process. The cholesteric color filter for sub-pixel regions corresponding to the open portions is formed through exposing to UV light through the open portions 302. The cholesteric liquid crystal is then cured or may be cured after all of the sub-pixels, including those that reflect other colors, have been exposed. Then, the mask 300 is shifted such that the plurality of open portions 302 correspond to the sub-pixel regions to be aligned to reflect a second color, which may be different than the first color. Then, the sub-pixel regions corresponding to the second color are formed through the exposing to UV light. Similarly, sub-pixel regions corresponding to a third color may be formed by shifting the mask and exposing to UV light. The cholesteric liquid crystal color filters aligned by the separate exposing processes may be cured after each respective exposing processes, or may all be cured together after all of the exposing steps have been completed. A CCF layer including the red, green and blue CCFs can thus be completed.

In detail, a cholesteric liquid crystal (CLC) material is coated on a substrate and an open portion 302 of a mask 300 is disposed over the coated CLC material to be aligned for a first sub-pixel region "$P_{sub}$." The coated CLC material is irradiated through the open portion 302 of the mask 300 with a first energy to align the CLC for a first color. The first color may be, for example, red, green or blue. The irradiated CLC material is cured to form CCFs corresponding to the first energy, and thus, the first color. After forming the first CCF, the mask 300 is shifted and aligned to expose a second sub-pixel region "$P_{sub}$" through the open portion. The coated CLC material is irradiated through the mask 300 with a second energy for a second color. CCFs corresponding to the second color are obtained by curing process the irradiated CLC material. CCFs corresponding to a third color may be obtained through again shifting the mask and irradiating a third energy onto the CLC material. A CCF layer may thus be completed.

In one aspect of the present invention, the open portion 302 has a smaller area than the sub-pixel region "$P_{sub}$" to minimize a color blurring at a border region between the adjacent sub-pixel regions "$P_{sub}$." For example, when the sub-pixel region "$P_{sub}$" has a width of about 90 μm and the black matrix has a width of about 24 μm, the open portion may have a width of about 66 μm.

Figure 8:
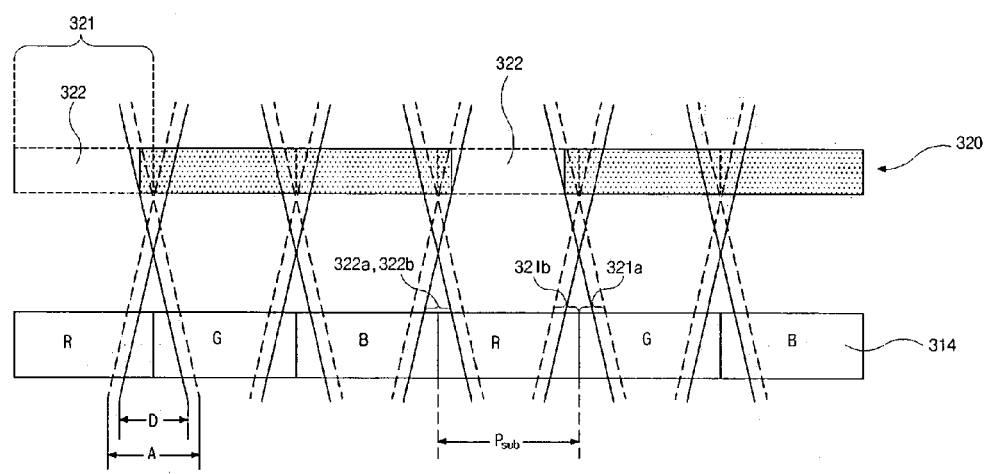
FIG. 8 is a schematic cross-sectional view showing a relationship between an open portion of a mask and a color blurring.

FIG. 8 is a schematic cross-sectional view illustrating a relationship between an open portion of a mask and a color blurring.

In FIG. 8, a mask 320 is disposed over a cholesteric liquid crystal (CLC) material 314 such that an open portion 322 corresponds to a sub-pixel region "$P_{sub}$." The open portion 322 is smaller than the sub-pixel region "$P_{sub}$." During a coloring process including irradiating and curing steps, light passing through the open portion 322 is diffused outward at a boundary of the open portion 322 due to optical phenomenon such as diffraction and interference. The diffused light is irradiated onto the CLC material 314 at a border region of the sub-pixel region "$P_{sub}$" and the CLC material 314 at the border region of the sub-pixel region "$P_{sub}$" has an undesired helical pitch. Accordingly, a color blurring occurs. When the open portion 321 has an area equal to the sub-pixel region "$P_{sub}$," as in related art, a first border region 321a for one color does not overlap a second border region 321b for the other color. Accordingly, the resulting color blurring region "A" is doubled. However, when the open portion 322 has a smaller area than the sub-pixel region "$P_{sub}$," first and second border regions 322a and 322b overlap each other. Accordingly, the resulting color blurring region "D" of the present invention is smaller than the resulting color blurring region "A" of the related art.

Figure 9:
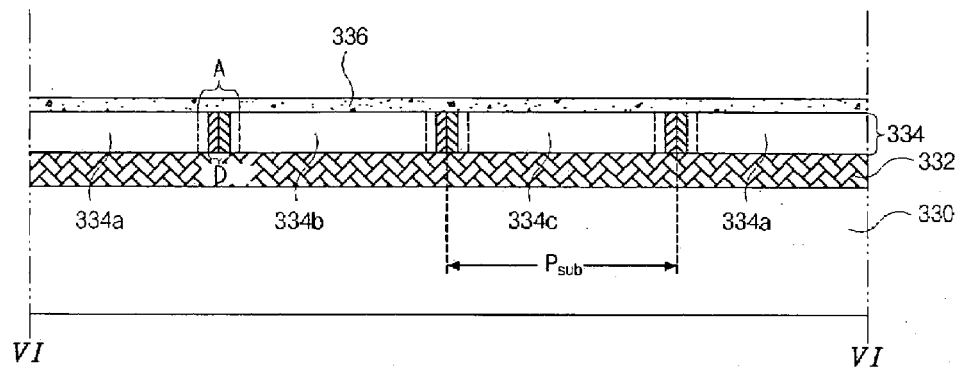
FIG. 9 is a schematic cross-sectional view illustrating a color filter substrate for a reflective liquid crystal display device according to a first embodiment of the present invention.

FIG. 9 is a schematic cross-sectional view illustrating a color filter substrate for a reflective liquid crystal display device according to a first embodiment of the present invention.

In FIG. 9, a light absorption layer 332 is formed on a substrate 330 and a cholesteric liquid crystal color filter (CCF) layer 334 is formed on the light absorption layer 332. The CCF layer 334 includes red, green and blue CCFs 334a, 334b and 334c in sub-pixel region "$P_{sub}$." A common electrode 336 is formed on the CCF layer 334. A color blurring occurs in the CCF layer 334 at a color blurring region "D" between the adjacent sub-pixel regions "$P_{sub}$." The color blurring region "D" formed by a mask having an open portion smaller than the sub-pixel region "$P_{sub}$" has an area of about a half of a color blurring region "A" formed by a mask having an open portion substantially equal to the sub-pixel region "$P_{sub}$." Color blurring region "A" is shown in FIG. 9 for reference.

Figure 10:
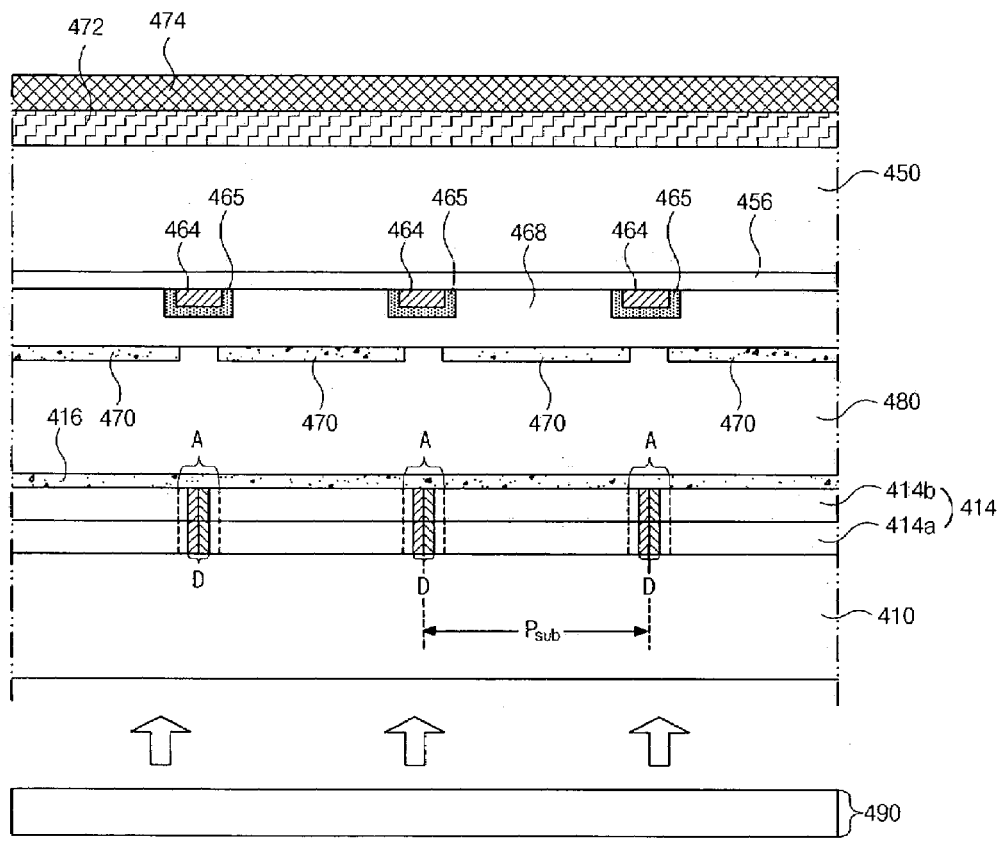
FIG. 10 is a schematic cross-sectional view illustrating a transmissive liquid crystal display device according to a second embodiment of the present invention.

FIG. 10 is a schematic cross-sectional view showing a transmissive liquid crystal display device according to a second embodiment of the present invention.

In FIG. 10, first and second substrates 410 and 450 face and are spaced apart from each other. The first and second substrates 410 and 450 include a plurality of sub-pixel regions "$P_{sub}$." A cholesteric liquid crystal color filter (CCF) layer 414 is formed on an inner surface of the first substrate 410, and a common electrode 416 is formed on the CCF layer 414. The CCF layer 414 includes first and second CCF layers 414a and 414b. Light having different wavelength selectively reflects from the first and second CCF layers 414a and 414b. For example, red CCF may include a first CCF reflecting green colored light and a second CCF reflecting blue colored light. Accordingly, green colored light and blue colored light reflect from the first and second CCFs to the backlight unit 490, respectively, and red colored light passes through the red CCF.

A gate line (not shown) is formed on an inner surface of the second substrate 450, and a gate insulating layer 456 is formed on the gate line. A data line 464 is formed on the gate insulating layer 456 at a border between the adjacent sub-pixel regions "$P_{sub}$." A black matrix 465 is formed on the data line 464, and a passivation layer 468 is formed on the black matrix 465. A pixel electrode 470 is formed on the passivation layer 468 in each sub-pixel region "$P_{sub}$." Even though not shown in FIG. 10, a switching element such as a thin film transistor (TFT) including a gate electrode, and source and drain electrodes is formed between the second substrate 450 and the passivation layer 468. Moreover, the passivation layer 468 includes a drain contact hole exposing the drain electrode, such that the pixel electrode 470 is connected to the drain electrode of the TFT through the drain contact hole. A retardation layer 472 and a polarizing layer 474 may be formed on an outer surface of the second substrate 450. A backlight unit 490 is disposed under the first substrate 410.

Figure 1:
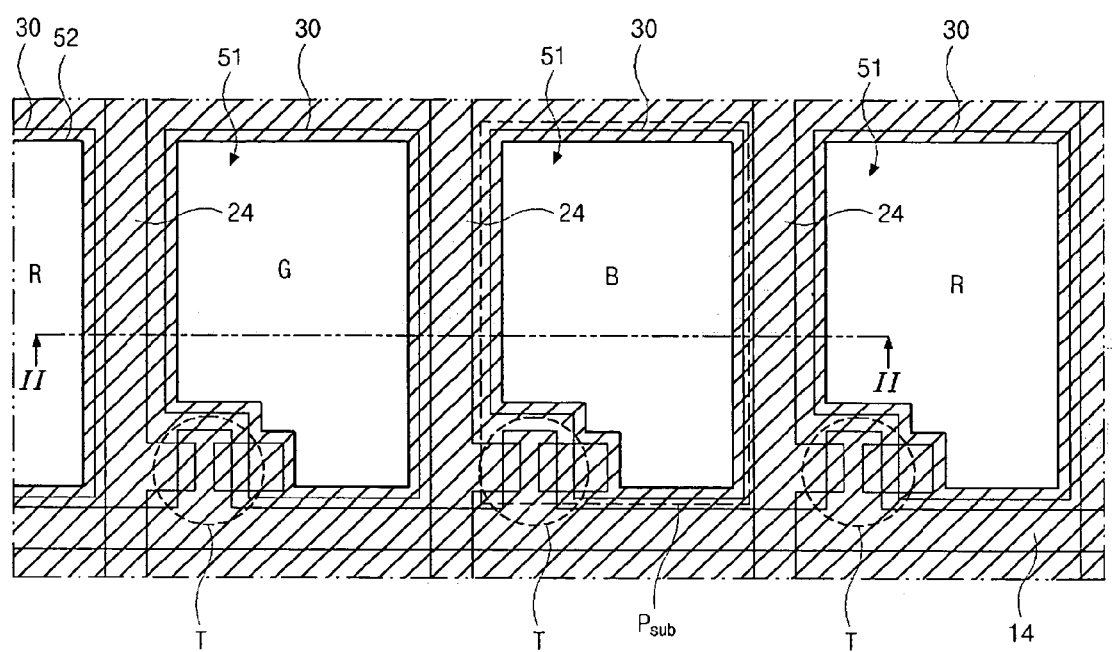
FIG. 1 is a schematic plan view of a liquid crystal display device according to the related art.
Figure 2:
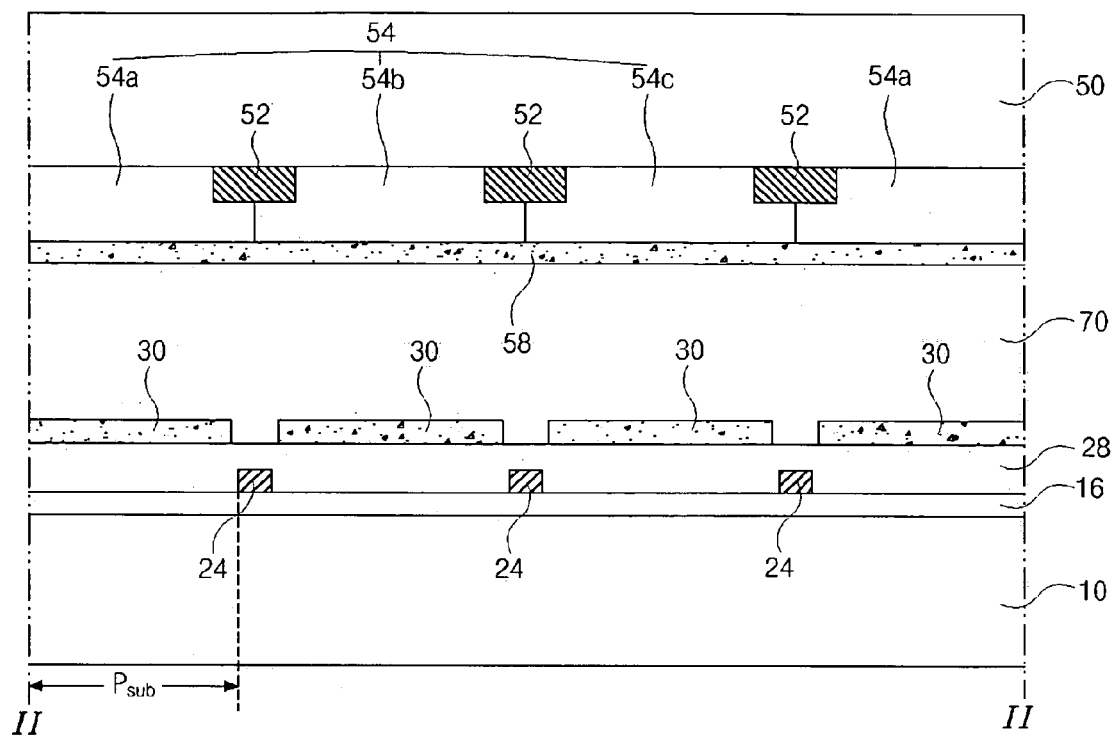
FIG. 2 is a schematic cross-sectional view, which is taken along a line "II—II" of FIG. 1, illustrating a liquid crystal display device according to the related art.
Figure 3:
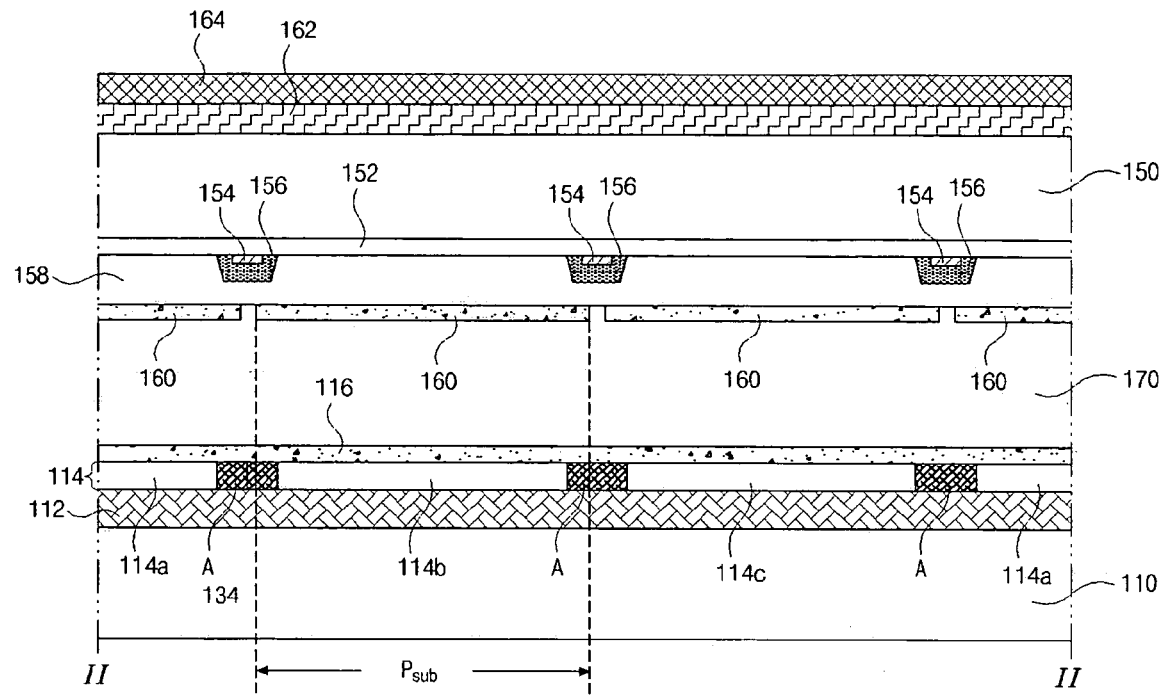
FIG. 3 is a schematic cross-sectional view, taken along a line "II—II" of FIG. 1, showing a liquid crystal display device using a cholesteric liquid crystal color filter layer according to the related art.
Figure 4A:
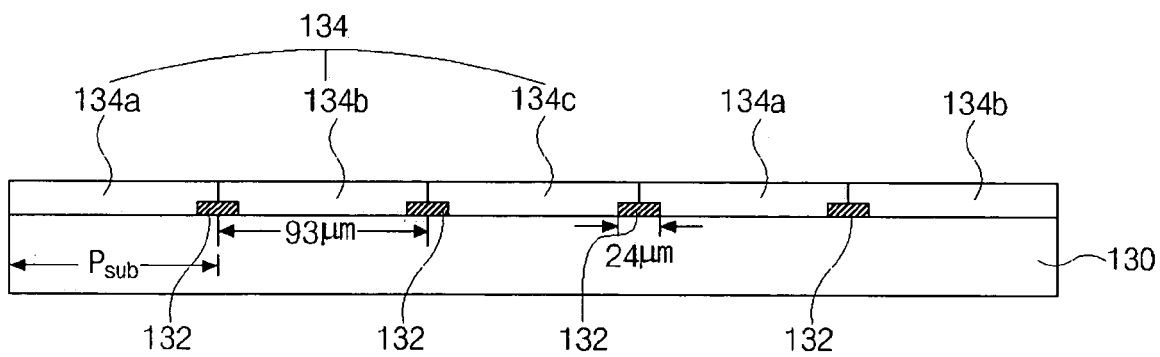
FIG. 4A is a schematic cross-sectional view of a substrate having an absorption type color filter layer according to the related art.
Figure 4B:
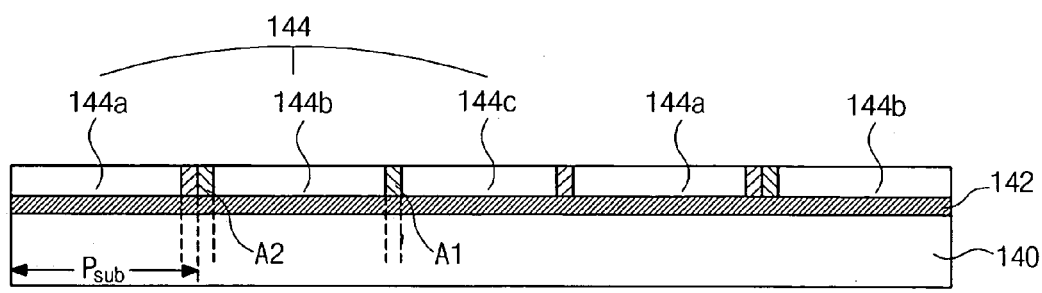
FIG. 4B is a schematic cross-sectional view of a substrate having a cholesteric liquid crystal color filter layer fabricated through a coloring method excluding a blue coloring process according to the related art.
Figure 4C:
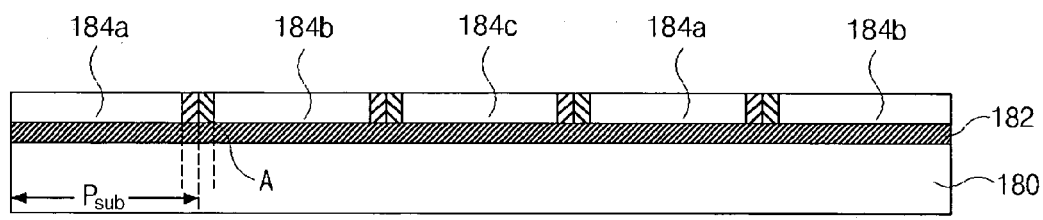
FIG. 4C is a schematic cross-sectional view of a substrate having a cholesteric liquid color filter layer fabricated through a coloring method including a blue coloring process according to the related art.

The common electrode 416 and the pixel electrode 470 may be formed of a transparent conductive material such as indium-tin-oxide (ITO) or indium-zinc-oxide (IZO). A liquid crystal layer 480 is formed between the common electrode 416 and the pixel electrode 470. Even though not shown in FIG. 10, first and second alignment layers may be formed on the common electrode 416 and the pixel electrode 470, respectively. The first and second CCF layers 414a and 414b may be formed of photochromic cholesteric liquid crystal (CLC). A color blurring region "D" in the first and second CCF layers 414a and 414b at a border between the adjacent sub-pixel regions is smaller than the color blurring region "A" of the related art as shown in FIG. 3. The color blurring region can be reduced by using a mask having an open portion smaller than the sub-pixel region "$P_{sub}$."

Figure 11:
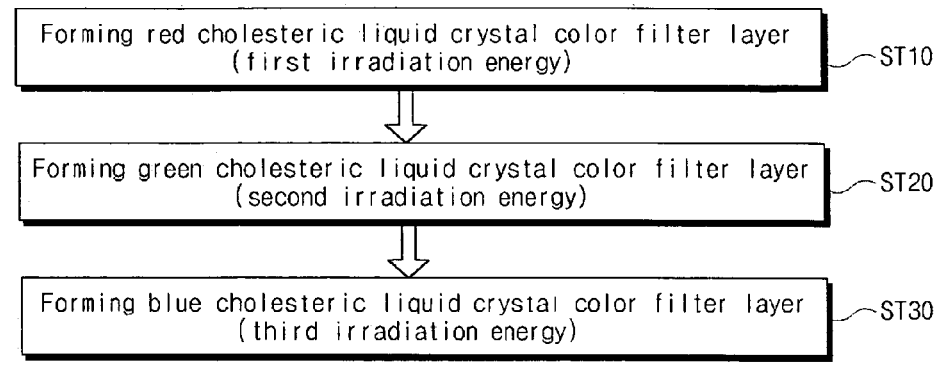
FIG. 11 is a schematic block diagram illustrating a fabricating process of red, green and blue cholesteric liquid crystal color filters according to a third embodiment of the present invention.

FIG. 11 is a schematic block diagram showing a fabricating process of red, green and blue cholesteric liquid crystal color filters according to a third embodiment of the present invention.

At step ST10, after a photochromic-cholesteric liquid crystal (CLC) material is coated on a substrate having red, green and blue sub-pixel regions to form a CLC layer, a mask having an open portion smaller than the sub-pixel region is disposed over the CLC layer such that the open portion corresponds to the red sub-pixel region. The CLC layer is irradiated through the mask with a first irradiation energy to form a red cholesteric liquid crystal color filter (CCF).

At step ST20, the mask is shifted and disposed over the CLC layer such that the open portion corresponds to the green sub-pixel region. Then, the CLC layer is irradiated through the mask with a second irradiation energy to form a green cholesteric liquid crystal color filter (CCF).

At step ST 30, the mask is shifted and disposed over the CLC layer such that the open portion corresponds to the blue sub-pixel region. Then, the CLC layer is irradiated through the mask with a third irradiation energy to form a blue cholesteric liquid crystal color filter (CCF).

In the fabricating process of red, green and blue CCFs, the first irradiation energy is higher than the second irradiation energy and the second irradiation energy is higher than the third irradiation energy. The irradiation energy for red CCF is highest. For example, when the first irradiation energy is about 300 mJ, the second and third irradiation energies may be about 200 mJ and about 100 mJ, respectively. Even though the red CCF is first formed in FIG. 11, the green or blue CCF may be formed first in another embodiment.

Figure 12:
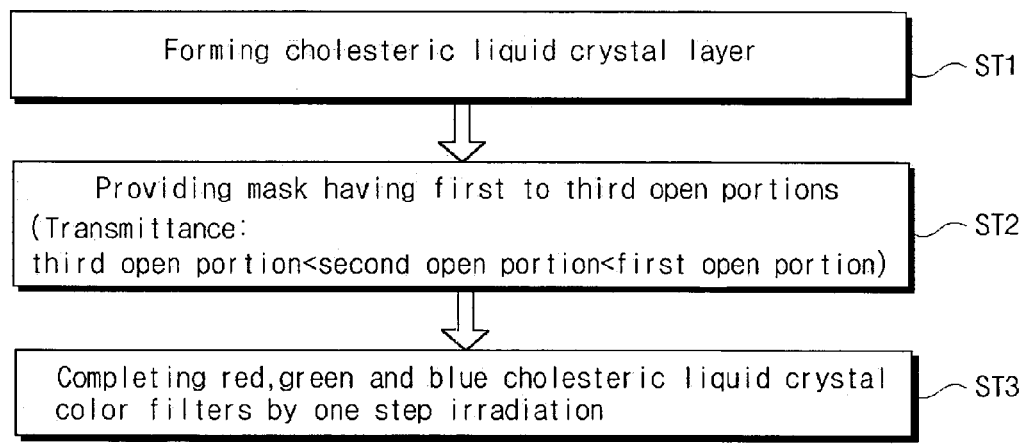
FIG. 12 is a schematic block diagram illustrating a fabricating process of red, green and blue cholesteric liquid crystal color filters according to a fourth embodiment of the present invention.

FIG. 12 is a schematic block diagram showing a fabricating process of red, green and blue cholesteric liquid crystal color filters according to a fourth embodiment of the present invention.

At step ST1, a photochromic cholesteric liquid crystal (CLC) material is coated on a substrate having red, green and blue sub-pixel regions to form a CLC layer.

At step ST2, a mask having first to third open portions is disposed over the CLC layer such that the first to third open portions correspond to the red, green and blue sub-pixel regions, respectively. Each of the first to third open portions is smaller than each of their respective red, green and blue sub-pixel regions. The first to third open portions have first to third transmittances, respectively. The first transmittance is higher than the second transmittance and the second transmittance is higher than the third transmittance.

At step ST3, the CLC layer is irradiated through the mask. Since the first to third open portions have different transmittances, the irradiation energies through the first to third open portions are different from each other. Accordingly, the CLC layer in the red sub-pixel region is irradiated with highest irradiation energy to be a red CCF and the CLC layer in the blue sub-pixel region is irradiated with lowest irradiation energy to be a blue CCF. When the CLC material having a helical pitch corresponding to blue color is coated, the third open portion is not necessary. The different transmittances can be obtained by a half tone mask or a slit patterned mask.

Figure 13:
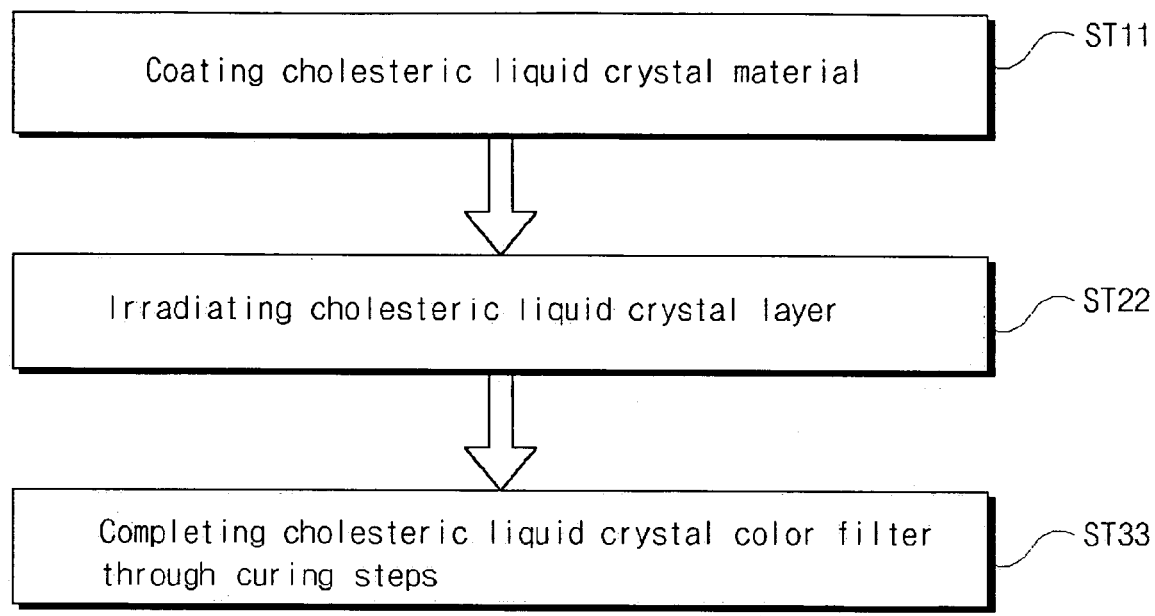
FIG. 13 is a schematic block diagram illustrating a fabricating process of a color filter substrate for a liquid crystal display device according to a first or second embodiment of the present invention.

FIG. 13 is a schematic block diagram showing a fabricating process of a color filter substrate for a liquid crystal display device according to a first or second embodiment of the present invention.

At step ST11, a photochromic cholesteric liquid crystal (CLC) material is coated on a substrate having a sub-pixel region to form a CLC layer.

At step ST22, a mask having an open portion is disposed over the CLC layer and the CLC layer is irradiated through the mask. The open portion is smaller than the sub-pixel region to minimize a color blurring.

At step ST33, the irradiated CLC layer is cured to form a red cholesteric liquid crystal color filter (CCF). Similarly, the irradiating and curing processes may be performed for the green and blue sub-pixel regions by shifting the mask. For a reflective LCD device, a light absorption layer is formed between the substrate and the CLC layer. For a transmissive LCD device, individual coloring processes are performed for first and second CCF layers.

Since a color blurring at a border region between the adjacent sub-pixel regions is minimized in an LCD device and a fabricating method thereof, a color property can be improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A fabricating method of a substrate for a liquid crystal display device, comprising:
    coating a first cholesteric liquid crystal material on a substrate to form a first cholesteric liquid crystal layer, the substrate having a plurality of sub-pixel regions;
    disposing a first mask having a plurality of first open portions over the first cholesteric liquid crystal layer;
    irradiating the first cholesteric liquid crystal layer through the open portions of the first mask;
    curing the first cholesteric liquid crystal layer to form a first cholesteric liquid crystal color filter layer;
    coating a second cholesteric liquid crystal material on the first cholesteric liquid crystal color filter layer to form a second cholesteric liquid crystal layer;
    disposing a second mask having a plurality of second open portions over the second cholesteric liquid crystal layer;
    irradiating the second cholesteric liquid crystal layer through the open portions of the second mask; and
    curing the second cholesteric liquid crystal layer to form a second cholesteric liquid crystal color filter layer,
    wherein each of the first and second open portions is smaller than each sub-pixel region.

2. The method according to claim 1, wherein the first mask and the second mask are the same mask.

3. The method according to claim 1, wherein the plurality of sub-pixel regions include red sub-pixel regions, green sub-pixel regions and blue sub-pixel regions.

4. The method according to claim 3, wherein the first and second cholesteric liquid crystal color filter layers in the red sub-pixel regions reflect green and blue colored lights, respectively, wherein the first and second cholesteric liquid crystal color filter layers in the green sub-pixel regions reflect blue and red colored lights, respectively, wherein the first and second cholesteric liquid crystal color filter layers in the blue sub-pixel regions reflect red and green colored lights, respectively.

5. A fabricating method of a liquid crystal display device, comprising:
    coating a first cholesteric liquid crystal material on a substrate to form a first cholesteric liquid crystal layer, the substrate having a plurality of sub-pixel regions;
    disposing a first mask having a plurality of first open portions over the first cholesteric liquid crystal layer;
    irradiating the first cholesteric liquid crystal layer through the open portions the first mask;
    curing the first cholesteric liquid crystal layer to form a first cholesteric liquid crystal color filter layer;
    coating a second cholesteric liquid crystal material on the first cholesteric liquid crystal color filter layer to form a second cholesteric liquid crystal layer;

disposing a second mask having a plurality of second open portions over the second cholesteric liquid crystal layer;

irradiating the second cholesteric liquid crystal layer through the open portions of the second mask;

curing the second cholesteric liquid crystal layer to form a second cholesteric liquid crystal color filter layer;

forming a common electrode on the second cholesteric liquid crystal color filter layer;

forming a gate line on a second substrate;

forming a data line crossing the gate line;

forming a switching device connected to the gate line and data line;

forming a passivation layer on the switching device;

forming a pixel electrode on the passivation layer;

attaching the first and second substrates such that the common electrode faces the pixel electrode; and forming a liquid crystal layer between the common electrode and the pixel electrode, wherein each of the first and second open portions is smaller than each sub-pixel region.

6. The method of claim 5, wherein the first mask and the second mask are the same mask.

7. The method of claim 5, further comprising forming a black matrix on the data line.

* * * * *